US011157829B2

(12) United States Patent
Kurata (10) Patent No.: US 11,157,829 B2
(45) Date of Patent: Oct. 26, 2021

(54) METHOD TO LEVERAGE SIMILARITY AND HIERARCHY OF DOCUMENTS IN NN TRAINING

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1135 days.

(21) Appl. No.: 15/653,007

(22) Filed: Jul. 18, 2017

(65) Prior Publication Data

US 2019/0026646 A1    Jan. 24, 2019

(51) Int. Cl.
| | | |
|---|---|---|
| *G06N 20/00* | (2019.01) | |
| *G06F 16/93* | (2019.01) | |
| *G06F 16/33* | (2019.01) | |
| *G06F 40/279* | (2020.01) | |

(52) U.S. Cl.
CPC ......... *G06N 20/00* (2019.01); *G06F 16/3344* (2019.01); *G06F 16/93* (2019.01); *G06F 40/279* (2020.01)

(58) Field of Classification Search
CPC ..... G06N 20/00; G06F 16/93; G06F 16/3344; G06F 40/279
See application file for complete search history.

(56) References Cited

U.S. PATENT DOCUMENTS 8,666,730 B2   3/2014   Todhunter et al.

2012/0054130 A1 *   3/2012   Mensink .............. G06K 9/6263
706/12

(Continued)

FOREIGN PATENT DOCUMENTS

| JP | 2009528627 A | 8/2009 |
|---|---|---|
| JP | 5710581 B2 | 4/2015 |
| WO | 2002057961 A2 | 7/2002 |

OTHER PUBLICATIONS

Kurata, Gakuto, et al.. "Improved neural network-based multi-label classification with better initialization leveraging label co-occurrence." Proceedings of the 2016 Conference of the North American Chapter of the Association for Computational Linguistics: Human Language Technologies, Jun. 2016. (Year: 2016).*

(Continued)

*Primary Examiner* — Eric Nilsson
(74) *Attorney, Agent, or Firm* — Tutunjian & Bitetto, P.C.; Randall Bluestone (57) ABSTRACT

A computer-implemented method for training a natural language-based classifier, includes obtaining a query and a first label which is a binary vector, each of a plurality of elements of the binary vector being associated with one of a plurality of instances, the first label indicating that the query is classified into a specific instance of the plurality of instances by a value set to a specific element associated with the specific instance, estimating relationships between the specific instance and instances other than the specific instance of the plurality of instances, generating a second label which is a continuous-valued vector from the first label by distributing the value set to the specific element to elements other than the specific element of the plurality of elements according to the relationships, and training the natural language-based classifier using the query and the second label.

20 Claims, 5 Drawing Sheets

(56) References Cited

U.S. PATENT DOCUMENTS

2014/0163962 A1    6/2014   Castelli et al.
2016/0350283 A1*   12/2016   Carus ..................... G06F 40/30
2018/0157743 A1*   6/2018   Hori ......................... G06N 3/08

OTHER PUBLICATIONS

Kumar, Ankit, et al. "Ask me anything: Dynamic memory networks for natural language processing." International conference on machine learning. 2016. (Year: 2016).*

Peters, Stéphane, et al. "Iterative multi-label multi-relational classification algorithm for complex social networks." Social Network Analysis and Mining 2.1 (2012): 17-29. (Year: 2012).*

Yih, Wen-Tau, et al., "Semantic Parsing for Single-Relation Question Answering," Proceedings of the 52nd Annual Meeting of the Association for Computational Linguistics (Short Papers), Jun. 2014. (pp. 643-648).

Nam, Jinseok, et al., "Large-scale Multi-label Text Classification-Revisiting Neural Networks," Joint European conference on machine learning and knowledge discovery in databases, May 2014. (pp. 1-16).

Kurata, Gakuto, et al., "Improved Neural Network-based Multi-label Classification with Better Initialization Leveraging Label Co-occurrence," Proceedings of NAACL-HLT, Jun. 2016. (pp. 521-526).

Severyn, Aliaksei, et al., "Modeling Relational Information in Question-Answer Pairs with Convolutional Neural Networks," Computing Research Repository (CoRR), Apr. 2016. (pp. 1-10).

\* cited by examiner

METHOD TO LEVERAGE SIMILARITY AND HIERARCHY OF DOCUMENTS IN NN TRAINING

BACKGROUND

Technical Field

The present invention relates to training a natural language-based classifier.

Description of the Related Art

Recently, various techniques have been known regarding training a natural language-based classifier.

SUMMARY

According to an embodiment of the present invention, there is provided a computer-implemented method for training a natural language-based classifier. The method includes obtaining a query and a first label which is a binary vector. Each element from a plurality of elements of the binary vector is associated with one instance from a plurality of instances. The first label indicates that the query is classified into a specific instance from the plurality of instances by a value set to a specific element associated with the specific instance. The method includes estimating relationships between the specific instance and instances other than the specific instance from the plurality of instances. The method includes generating a second label which is a continuous-valued vector from the first label by distributing the value set to the specific element to elements other than the specific element from the plurality of elements according to the relationships. The method includes training the natural language-based classifier using the query and the second label.

According to another embodiment of the present invention, an apparatus for training a natural language-based classifier is provided. The apparatus includes a processor and a memory coupled to the processor. The memory includes program instructions executable by the processor to cause the processor to perform a method for training a natural language-based classifier. The method includes obtaining a query and a first label as a binary vector, each of a plurality of elements of the binary vector being associated with one instance of a plurality of instances. The first label indicates that the query is classified into a specific instance from the plurality of instances by a value set to a specific element associated with the specific instance. The method includes estimating relationships between the specific instance and instances other than the specific instance from the plurality of instances, generating a second label which is a continuous-valued vector from the first label by distributing the value set to the specific element to elements other than the specific element from the plurality of elements according to the relationships, and training the natural language-based classifier using the query and the second label.

According to another embodiment of the present invention, a computer program product for training a natural language-based classifier is provided. The computer program product includes a non-transitory computer readable storage medium having program instructions embodied with the computer readable storage medium. The program instructions are executable by a computer to cause the computer to perform a method for training a natural language-based classifier. The method includes obtaining a query and a first label as a binary vector, each of a plurality of elements of the binary vector being associated with one instance from a plurality of instances. The first label indicates that the query is classified into a specific instance from the plurality of instances by a value set to a specific element associated with the specific instance. The method includes estimating relationships between the specific instance and instances other than the specific instance from the plurality of instances, generating a second label which is a continuous-valued vector from the first label by distributing the value set to the specific element to elements other than the specific element from the plurality of elements according to the relationships, and training the natural language-based classifier using the query and the second label.

DETAILED DESCRIPTION

Hereinafter, exemplary embodiments of the present invention will be described in detail with reference to the attached drawings.

It should be noted that the present invention is not limited to these exemplary embodiments to be given below and may be implemented with various modifications within the scope of the present invention. In addition, the drawings used herein are for purposes of illustration, and may not show actual dimensions.

A natural language-based classifier may be used to retrieve one or more documents associated with an answer to a question. The exemplary embodiments may train such natural language-based classifier using relationships between documents to be determined whether to be retrieved, and thus improve accuracy of retrieving the one or more documents using the natural language-based classifier. Note that, in the exemplary embodiments described below, the natural language-based classifier is assumed to be neural network-based.

Figure 1:
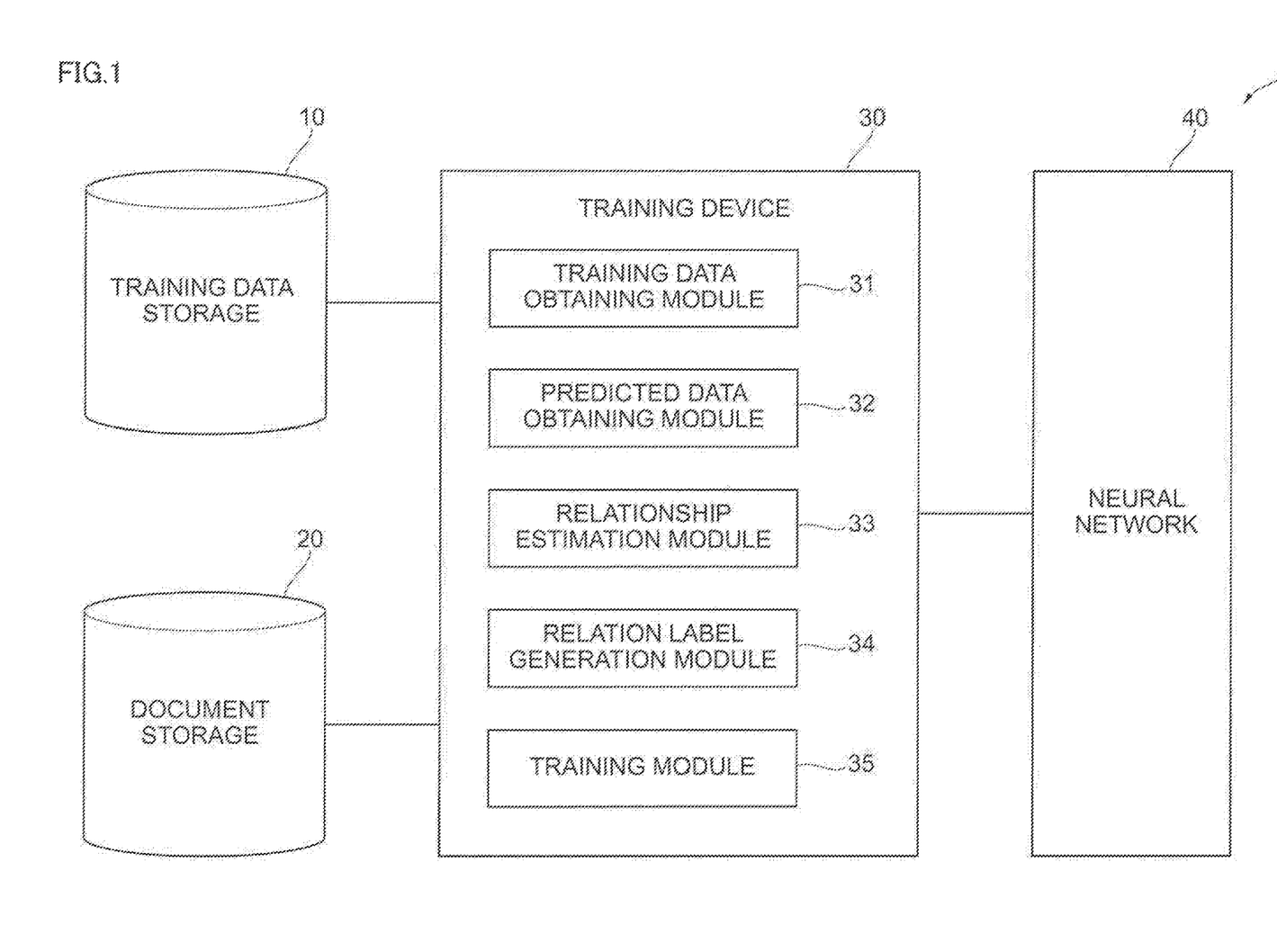
FIG. 1 is a block/flow diagram showing a natural language-based classifier training system according to an embodiment of the present invention.

Referring to FIG. 1, a block/flow diagram of a natural language-based classifier training system 1 is shown according to an exemplary embodiment. As shown in the figure, the natural language-based classifier training system 1 may include a training data storage 10, a document storage 20, a training device 30, and a neural network 40.

The training data storage 10 may store training data for training the neural network 40. The training data may include pairs of a question and a document label. The document label may indicate one or more documents each associated with an answer to the question. Specifically, the document label is assumed to be represented in the form of a binary vector. If the Kth document is associated with an answer, the Kth element of the binary vector is assumed to be set to "1" (K is a natural number). Hereinafter, the document label in the form of the binary vector is referred to as an "original label".

The document storage 20 may store a plurality of documents as examples of claimed instances. The plurality of documents may be configured such that relationships can be defined between the plurality of documents. The relationships may be similarities each of which indicates to what extent contents of two documents from the plurality of documents are similar. Alternatively, the relationships may be hierarchies each of which indicates whether or not one of two documents from the plurality of documents can be a parent document, a sibling document, or the like of the other of the two documents. In this case, the plurality of documents are required to be configured hierarchically.

The training device 30 may train the neural network 40 using the training data stored in the training data storage 10 and the relationships between the plurality of documents stored in the document storage 20. As shown in the figure, the training device 30 may include a training data obtaining module 31, a predicted data obtaining module 32, a relationship estimation module 33, a relation label generation module 34, and a training module 35.

The training data obtaining module 31 may obtain the training data from the training data storage 10. As described above, the training data may include pairs of a question and an original label. Hereinafter, the question included in the training data is referred to as a "training question", and the original label included in the training data is referred to as a "training original label". Note that the training question serves as one example of a claimed query, and the training original label serves as one example of a claimed first label.

The predicted data obtaining module 32 may obtain predicted data from the neural network 40. The predicted data may be data predicted by the neural network 40, and include a label outputted from the neural network 40 in response to input of the training question to the neural network 40. Hereinafter, the label included in the predicted data is referred to as a "predicted label".

The relationship estimation module 33 may estimate relationships between the plurality of documents stored in the document storage 20. For example, the relationship estimation module 33 may estimate similarities between the plurality of documents as the relationships.

The relation label generation module 34 may generate a new document label based on the relationships estimated by the relationship estimation module 33. The new document label may be generated from the original label by distributing, using the relationships, a value of an element partially to other elements. Thus, the new document label is assumed to be represented in the form of a continuous-valued vector. If the Kth document has a high relationship with the document associated with an answer, the Kth element of the continuous-valued vector is assumed to be set to a value greater than "0" and not greater than "1" (K is a natural number). Hereinafter, the new document label in the form of the continuous-valued vector is referred to as a "relation label". Further, the relation label generated from the training original label is referred to as a "training relational label". Note that the training relation label serves as one example of a claimed second label. Further description on generating the training relation label from the training original label will be described later.

The training module 35 may train the neural network 40 using a combination of two loss functions. For example, the combination of the two loss functions may be a sum of the two loss functions. One of the two loss functions may be cross-entropy indicating difference between the training original label and the predicted label. The other of the two loss functions may be cross-entropy indicating difference between the training relation label and the predicted label. In this case, the cross-entropy indicating difference between the training original label and the predicted label serves as one example of claimed cross-entropy based on the first label, and the cross-entropy indicating difference between the training relation label and the predicted label serves as one example of claimed cross-entropy based on the second label.

The neural network 40 may be a neural network-based natural language-based classifier. Thus, the neural network 40 serves as one example of a claimed natural language-based classifier. The neural network 40 may output the predicted label in response to input of the training question. The neural network 40 may be implemented with a convolutional neural network (CNN), a recurrent neural network (RNN), a feedforward neural network, and the like.

Figure 2:
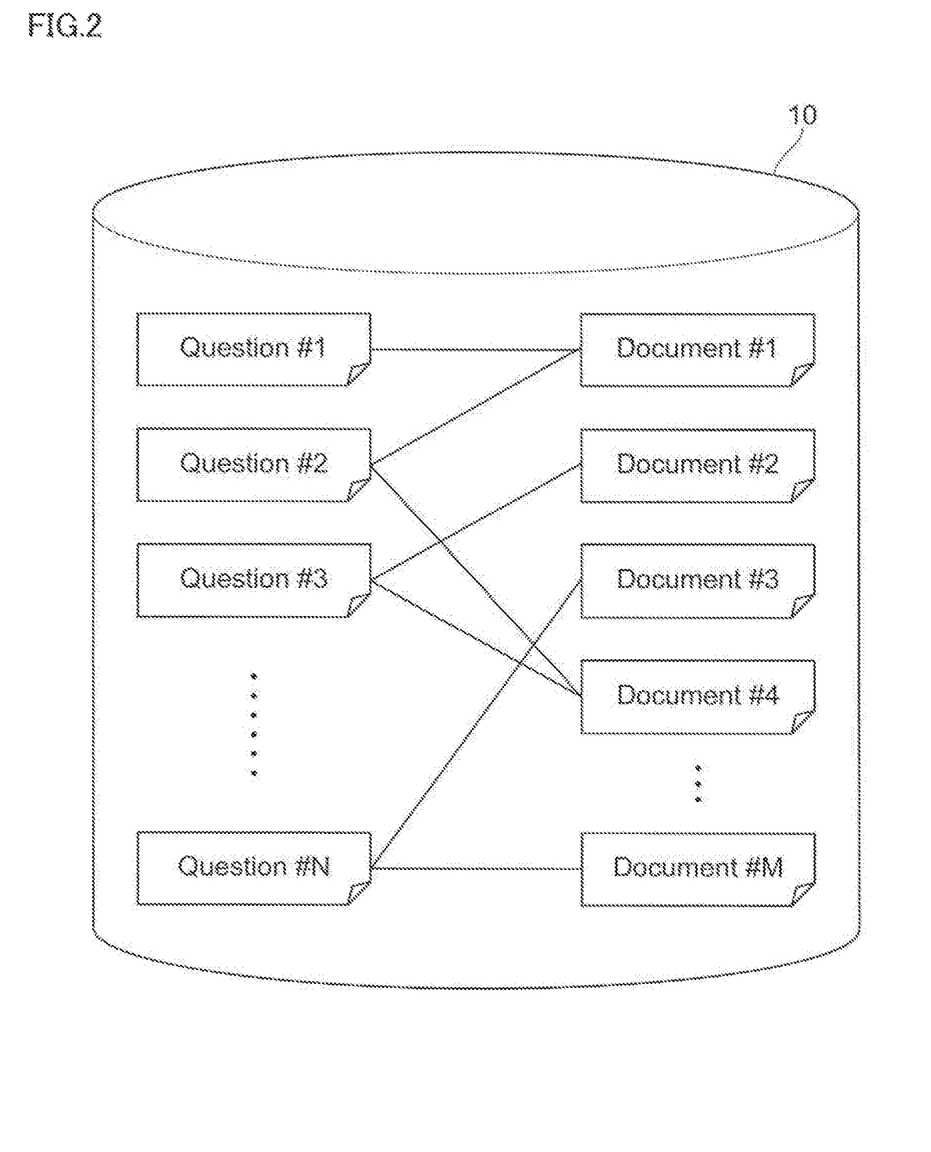
FIG. 2 is a conceptual diagram illustrating an example of training data according to an embodiment of the present invention.

Referring to FIG. 2, a conceptual diagram of an example of the training data stored in the training data storage 10 is shown. Although in the conceptual diagram, the training data includes correspondences between a training question ("Question" in the figure) and one or more documents associated with an answer to the training question, the training question may in reality have a training original label indicating the one or more documents. For example, although in the conceptual diagram, the training data includes correspondences between a training question #2 and documents #1 and #4, the training question #2 may in reality have a training original label "1, 0, 0, 1, . . . , 0" indicating that the documents #1 and #4 are associated with an answer to the training question #2.

Further, this training data may be used to train the neural network 40. After being trained with this training data, in response to input of a new question, the neural network 40 may compare a feature of the new question with features of the training questions, and select a training question whose feature is similar to the feature of the new question. Then, the neural network 40 may detect probabilities each indicating that a corresponding document is associated with the selected training question, and output the probabilities as the predicted label. For example, in response to input of a new question similar to the question #2, the neural network 40 may detect the probabilities 1, 0, 0, 1, . . . , 0, and output the probabilities as the predicted label. Thus, the documents #1 and #4 may be found to be associated with an answer to the new question.

Figure 3:
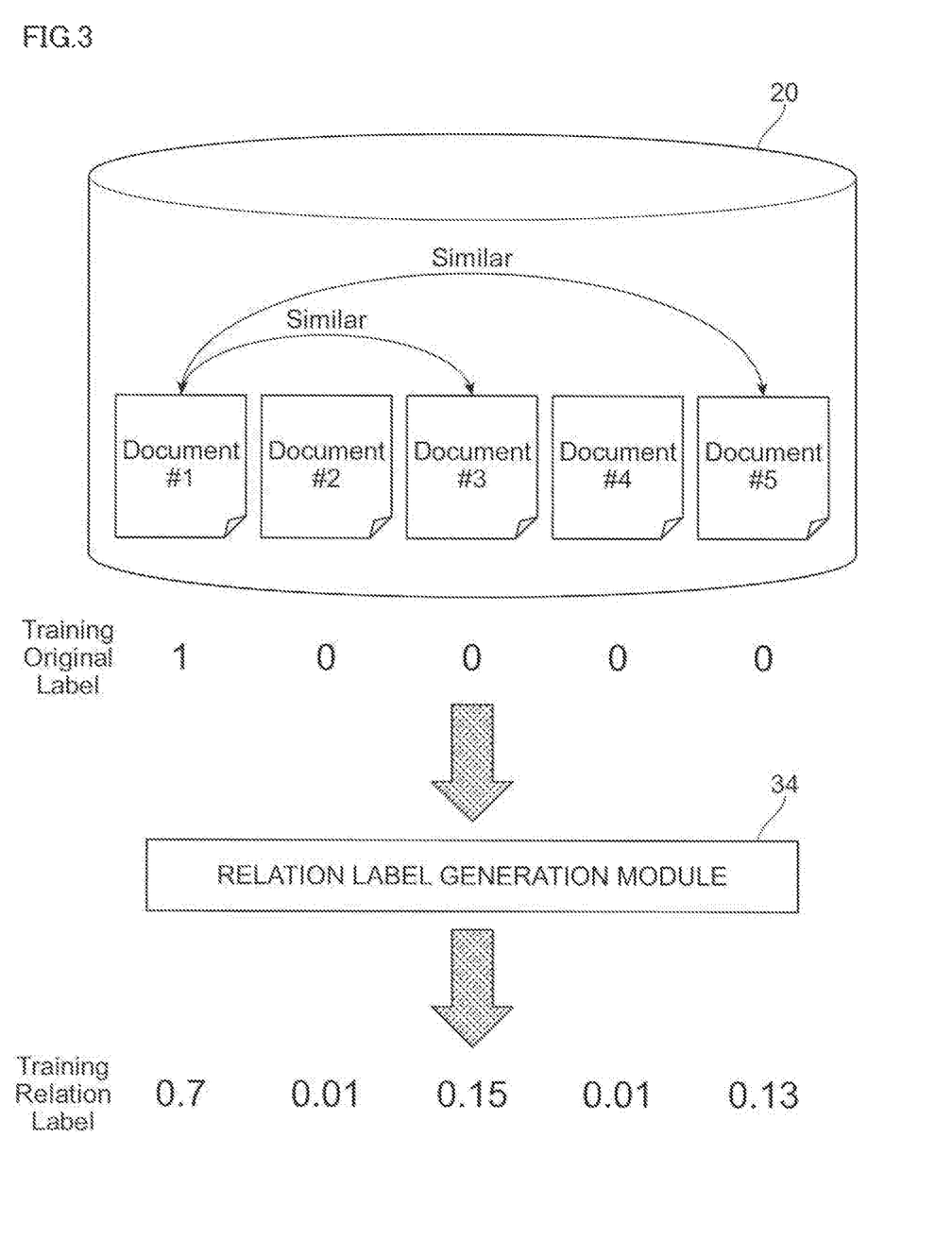
FIG. 3 is an example of generation of a relation label from an original label according to an embodiment of the present invention.

Referring to FIG. 3, an example is shown illustrating generation of the training relation label from the training original label. Note that, in the following description, in both a vector indicating the training relation label and a vector indicating the training original label, an element corresponding to a document #K is referred to as an "element #K" (K=1, 2, 3, 4, 5).

In this example, it is assumed documents #1 to #5 are stored in the document storage 20 and only document #1 has been found to be associated with an answer to a certain training question. In this case, as shown in the figure, the training original label corresponding the certain training question may be "1, 0, 0, 0, 0". That is, in a binary vector indicating the training original label, only the element #1 may be set to "1", and the other elements may be set to "0".

Meanwhile, in an example, it is also assumed that document #1 and document #3 are similar, document #1 and document #5 are similar, and document #1 and any of the documents #2 and #4 are dissimilar. In this case, the relation label generation module 34 may generate the training relation label by distributing a value of the element #1 of the training original label partially to other elements. As shown in the figure, the training relation label corresponding the certain training question may be "0.7, 0.01, 0.15, 0.01, 0.13". That is, in a continuous-valued vector indicating the training relation label, the elements #1, #2, #3, #4 and #5 may be set to "0.7", "0.01", "0.15", "0.01", "0.13", respectively. The amount of a part of the value of the element #1 distributed to the element #K may depend on similarity between the document #1 and the document #K (K=2, 3, 4, 5). The amount of such part may be larger as the similarity is higher.

Next, operations of the training device 30 according to exemplary embodiments are described.

Figure 4:
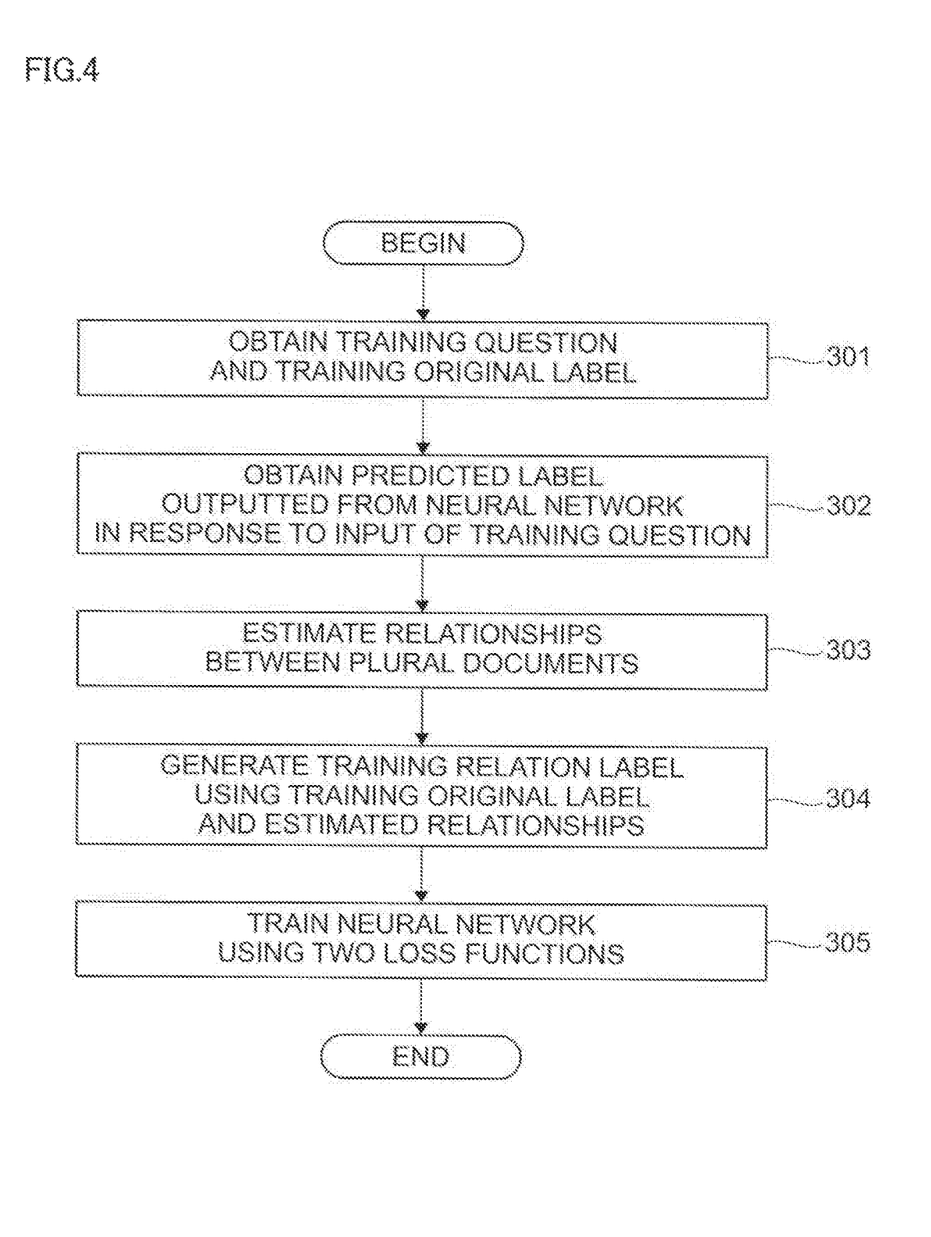
FIG. 4 is a flowchart representing an example of an operation of a training device according to an embodiment of the present invention.

Referring to FIG. 4, a flowchart representing an example of an operation of the training device 30 according to an exemplary embodiment is illustrated.

As shown in the figure, the training data obtaining module 31 may obtain a training question and a training original label (step 301). In the exemplary embodiment, the training question and the training original label are assumed to be read out from the training data stored in the training data storage 10. However, the training question and the training original label may be inputted using an input device. The training original label may indicate one or more documents associated with an answer to the training question. Meanwhile, the predicted data obtaining module 32 may obtain a predicted label outputted from the neural network 40 in response to input of the training question (step 302). The predicted label may indicate one or more documents predicted by the neural network 40 to be associated with an answer to the training question.

Then, the relationship estimation module 33 may estimate relationships between a plurality of documents stored in the document storage 20 (step 303). For example, the relationship estimation module 33 may estimate, as the relationships, similarities between the plurality of documents. The similarities may include a cosine similarity between two documents among the plurality of documents, a similarity based on the number of words commonly appearing in the two documents, and the like. Alternatively, the relationship estimation module 33 may estimate, as the relationships, distances between the plurality of documents within a tree structure including the hierarchies.

Next, the relation label generation module 34 may generate a training relation label using the training original label obtained at step 301 and the relationships estimated at step 303 (step 304). A case is assumed where a value of an element #X is set to "1" among values of elements #1 to #M of the training original label (X is an integer not less than 1 and not more than M). In this case, for example, the relation label generation module 34 may calculate values of elements #1 to #M of the training relation label in the following manner. At the first step, the relation label generation module 34 may set a temporary value #K to "1" if K is equal to X, and calculate a temporary value #K by adding the cosine similarity between the document #K and the document #X to a value of the element #K of the training original label if K is not equal to X (K=1, . . . , M). At the second step, the relation label generation module 34 may calculate values of the elements #1 to #M of the training relation label by normalizing the temporary values #1 to #M so that a sum of values of the elements #1 to #M of the training relation label is equal to 1. For example, a softmax function may be used to normalize the temporary values #1 to #M.

Subsequently, the training module 35 may train the neural network 40 using two loss functions (step 305). For example, the training module 35 may train the neural network 40 using a sum of the two loss functions. One of the two loss functions may be cross-entropy indicating difference between the training original label and the predicted label. The other of the two loss functions may be cross-entropy indicating difference between the training relation label and the predicted label.

Next, another exemplary embodiment will be described. The exemplary embodiment is the same as the above described exemplary embodiment except for the function of the training module 35 of FIG. 1 and the processing at step 305 of FIG. 4. In the exemplary embodiment, the training module 35 may train the neural network 40 using one loss function. The one loss function may be cross-entropy indicating a difference between a label pair and the predicted label. The label pair may be a pair of the training original label and the training relation label. For example, the pair may be a sum of the training original label and the training relation label. Note that the cross-entropy indicating the difference between the label pair and the predicted label serves as one example of claimed cross-entropy based on the first label and the second label. Alternatively, the one loss function may be cross-entropy indicating differences between the training original label and the predicted label, or cross-entropy indicating differences between the training relation label and the predicted label.

Figure 5:
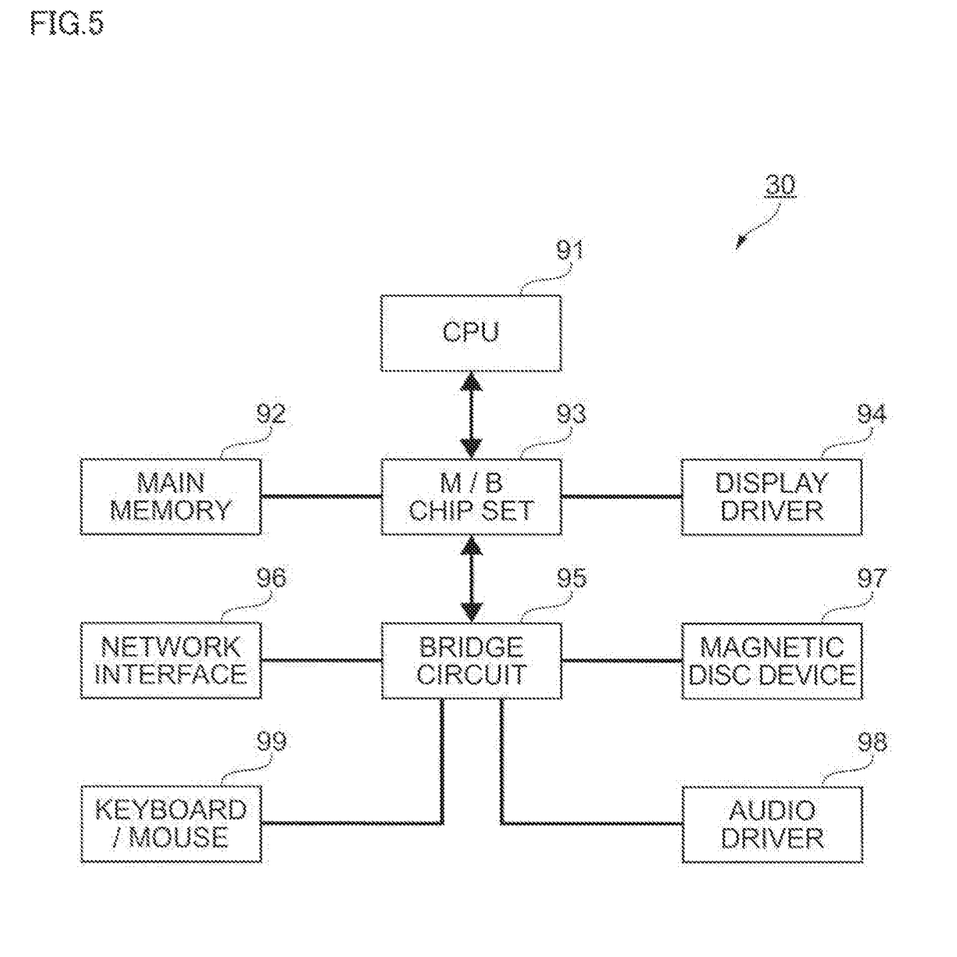
FIG. 5 is an example of a hardware configuration of a training device according to embodiments of the present invention.

Referring to FIG. 5, an example of a hardware configuration of the training device 30 in the exemplary embodiments is depicted. As shown in the figure, the training device 30 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 5, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a natural language-based classifier, the method comprising:
   obtaining a query and a document label represented by a binary vector, each of a plurality of elements of the binary vector being associated with at least one instance from a plurality of instances, the document label indicating that the query is classified into a specific instance from the plurality of instances by a value set to a specific element associated with the specific instance;

estimating relationships between the specific instance and instances other than the specific instance from the plurality of instances;

generating a relation label represented by a continuous-valued vector from the document label by distributing the value set to the specific element to elements other than the specific element from the plurality of elements according to the relationships;

training the natural language-based classifier using the query and the relation label; and detecting probabilities each indicating that a corresponding instance is associated with a selected training query to output predicted labels.

2. The method of claim 1, wherein the relationships are similarities.

3. The method of claim 2, wherein the similarities include a cosine similarity between two documents among the plurality of documents.

4. The method of claim 3, wherein the similarities are based on a number of words commonly appearing in the two documents.

5. The method of claim 1, wherein training includes training the natural language-based classifier using the document label.

6. The method of claim 5, wherein:
training includes training the natural language-based classifier using two loss functions; and
the two loss functions are a loss function which is cross-entropy based on the document label, and a loss function which is cross-entropy based on the relation label.

7. The method of claim 5, wherein:
training includes training the natural language-based classifier using one loss function; and
the one loss function is cross-entropy based on the document label and the relation label.

8. An apparatus for training a natural language-based classifier, the apparatus comprising:
a processor; and
a memory coupled to the processor, wherein:
the memory comprises program instructions executable by the processor to cause the processor to perform a method comprising:
obtaining a query and a document label represented by a binary vector, each of a plurality of elements of the binary vector being associated with at least one instance from a plurality of instances, the document label indicating that the query is classified into a specific instance from the plurality of instances by a value set to a specific element associated with the specific instance;
estimating relationships between the specific instance and instances other than the specific instance from the plurality of instances;
generating a relation label represented by a continuous-valued vector from the document label by distributing the value set to the specific element to elements other than the specific element from the plurality of elements according to the relationships;
training the natural language-based classifier using the query and the relation label; and
detecting probabilities each indicating that a corresponding instance is associated with a selected training query to output predicted labels.

9. The apparatus of claim 8, wherein the relationships are similarities.

10. The apparatus of claim 9, wherein the similarities include a cosine similarity between two documents among the plurality of documents.

11. The apparatus of claim 10, wherein the similarities are based on a number of words commonly appearing in the two documents.

12. The apparatus of claim 8, wherein training includes training the natural language-based classifier using the document label.

13. The apparatus of claim 12, wherein:
training includes training the natural language-based classifier using two loss functions; and
the two loss functions are a loss function which is cross-entropy based on the document label, and a loss function which is cross-entropy based on the relation label.

14. The apparatus of claim 12, wherein:
training includes training the natural language-based classifier using one loss function; and
the one loss function is cross-entropy based on the document label and the relation label.

15. A computer program product for training a natural language-based classifier, the computer program product comprising a non-transitory computer readable storage medium having program instructions embodied therewith, the program instructions executable by a computer to cause the computer to perform a method comprising:
obtaining a query and a document label represented by a binary vector, each of a plurality of elements of the binary vector being associated with at least one instance from a plurality of instances, the document label indicating that the query is classified into a specific instance from the plurality of instances by a value set to a specific element associated with the specific instance;
estimating relationships between the specific instance and instances other than the specific instance from the plurality of instances;
generating a relation label represented by a continuous-valued vector from the document label by distributing the value set to the specific element to elements other than the specific element from the plurality of elements according to the relationships;
training the natural language-based classifier using the query and the relation label; and
detecting probabilities each indicating that a corresponding instance is associated with a selected training query to output predicted labels.

16. The computer program product of claim 15, wherein the relationships are similarities.

17. The computer program product of claim 16, wherein the similarities include a cosine similarity between two documents among the plurality of documents.

18. The computer program product of claim 15, wherein training includes training the natural language-based classifier using the document label.

19. The computer program product of claim 18, wherein:
training includes training the natural language-based classifier using two loss functions; and the two loss functions are a loss function which is cross-entropy based on the document label, and a loss function which is cross-entropy based on the relation label.

20. The computer program product of claim 18, wherein:

training includes training the natural language-based classifier using one loss function; and the one loss function is cross-entropy based on the document label and the relation label.

\* \* \* \* \*